United States Patent
Lim (10) Patent No.: US 12,449,974 B2
(45) Date of Patent: Oct. 21, 2025

(54) MEMORY COMPRESSION WITH IMPROVED LOOKUP TABLE SCHEME

(71) Applicant: MICRON TECHNOLOGY, INC., Boise, ID (US)

(72) Inventor: Su Wei Lim, Penang (MY)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/784,292

(22) Filed: Jul. 25, 2024

(65) Prior Publication Data
US 2025/0085851 A1    Mar. 13, 2025

Related U.S. Application Data

(60) Provisional application No. 63/537,624, filed on Sep. 11, 2023.

(51) Int. Cl.
*G06F 3/06* (2006.01)

(52) U.S. Cl.
CPC .......... *G06F 3/0608* (2013.01); *G06F 3/0644* (2013.01); *G06F 3/0673* (2013.01)

(58) Field of Classification Search
CPC ..... G06F 3/0608; G06F 3/0644; G06F 3/0673
See application file for complete search history.

(56) References Cited

U.S. PATENT DOCUMENTS

| | | | |
|---|---|---|---|
| 2003/0163328 A1* | 8/2003 | Rambo | G06F 3/16 704/500 |
| 2006/0139786 A1* | 6/2006 | You | G11B 27/105 |
| 2017/0177602 A1* | 6/2017 | Constantinescu | H03M 7/3077 |
| 2023/0306551 A1* | 9/2023 | Krishnan | G06T 9/00 |

* cited by examiner

*Primary Examiner* — Prasith Thammavong
(74) *Attorney, Agent, or Firm* — Lowenstein Sandler LLP (57) ABSTRACT

A system can include a memory; and a processing device, operatively coupled with the memory, to perform operations including: partitioning the memory into a plurality of memory partitions, wherein each of the plurality of memory partitions is associated with a corresponding partition identifier; receiving a host command to access data; identifying a compression ratio of the data; identifying a memory partition among the plurality of memory partitions; identifying a location among a plurality of locations on the memory partition by using a segment identifier and a unit offset address, wherein each of the plurality of locations is associated with a corresponding segment identifier, and wherein the unit offset address is determined in view of a compression ratio range associated with the memory partition; and performing an operation regarding the data at the identified location on the memory partition.

20 Claims, 7 Drawing Sheets

| Partition Identifier 420 | Segment Identifier 430 | Compression Ratio Value for unit offset address 440 |
|---|---|---|
| Partition 1 | Seg1 | CR1 |
| ... | ... | ... |
| Partition Y | SegZ | CRm |
| ... | ... | ... |

```
┌─────────────────────────────────────────────────────────┐
│ Partition the memory into a plurality of memory         │
│ partitions, wherein each of the plurality of memory     │
│ partitions is associated with a corresponding           │
│ partition identifier                                    │
│ 510                                                     │
└─────────────────────────────────────────────────────────┘
                            │
                            ▼
┌─────────────────────────────────────────────────────────┐
│ Receive a host command to access data                   │
│ 520                                                     │
└─────────────────────────────────────────────────────────┘
                            │
                            ▼
┌─────────────────────────────────────────────────────────┐
│ Identify a compression ratio of the data                │
│ 530                                                     │
└─────────────────────────────────────────────────────────┘
                            │
                            ▼
┌─────────────────────────────────────────────────────────┐
│ Identify a memory partition among the plurality of      │
│ memory partitions                                       │
│ 540                                                     │
└─────────────────────────────────────────────────────────┘
                            │
                            ▼
┌─────────────────────────────────────────────────────────┐
│ Identify a location among a plurality of locations on   │
│ the memory partition by using a segment identifier and  │
│ the unit offset address, where each of the plurality    │
│ of locations is associated with a corresponding segment │
│ identifier, and where the unit offset address is        │
│ determined in view of a compression ratio range         │
│ associated with the memory partition                    │
│ 550                                                     │
└─────────────────────────────────────────────────────────┘
                            │
                            ▼
┌─────────────────────────────────────────────────────────┐
│ Perform an operation regarding the data at the          │
│ identified location on the memory partition.            │
│ 560                                                     │
└─────────────────────────────────────────────────────────┘
```

MEMORY COMPRESSION WITH IMPROVED LOOKUP TABLE SCHEME

REFERENCE TO RELATED APPLICATION

This application claims the benefit of U.S. Provisional Patent Application No. 63/537,624, filed Sep. 11, 2023, which is incorporated herein by reference.

TECHNICAL FIELD

Embodiments of the disclosure relate generally to memory sub-systems, and more specifically, relate to implementing memory compression in memory sub-systems with an improved lookup table scheme.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

Aspects of the present disclosure are directed to implementing memory compression with an improved lookup table scheme. A memory sub-system can be a storage device, a memory module, or a combination of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

Memory compression can be used to increase the amount of data that can be stored in a memory by compressing the contents of the memory. For example, data can be compressed upon being stored in the memory and decompressed upon being retrieved. The compression and decompression operations, however, are computationally-intensive and can increase access times. Thus, there is a trade-off between reduction in the size of stored data and increased overhead, such as increased access time and processing caused by compression. It is desirable to compress data for which the benefit of reduction in the size of data outweighs the cost of increased latency over a period of time and the cost of additional access and processing caused by compression and decompression.

Further, a cache can be used to speed up access to data stored on slower media by temporarily storing portions of the data on faster media that can be accessed more quickly than the slower media. Thus, data that is in the cache can be read more quickly than data that is not in the cache.

In one example, when the host system sends a request to write data, the memory sub-system controller can compress the data and track the available memory in the memory. The memory sub-system controller can assign a compressed address to the compressed data, and can write the compressed data at the compressed address. The compressed address is the memory physical address referencing the start location of the compressed data. Depending on the compression ratio, the compressed data may or may not occupy an entirety of the free space (e.g., free cache line, which is the smallest portion of data that can be mapped into a cache) in the memory. The length of the compressed data can depend on the compression ratio for a given data. The request to write data includes a host physical address, and when the compressed address is assigned, the compressed address maps to the host physical address. The memory sub-system controller can maintain a lookup table in the memory to keep records of the host physical address, the compressed address, the length of the compressed data, and the compression ratio. With the lookup table, the memory sub-system controller can translate between the host physical address and the compressed address. In some implementations, the memory sub-system controller can use a lookup table cache to cache the lookup table. In some implementations, depending on the cache implementation policy (i.e., write-through or write-back), the lookup table in the memory may be updated according to the lookup table cache. Because the content stored in the lookup table includes the full address of the host physical address and the full address of the compressed address, and both full addresses take up a good amount of memory size, the lookup table cache usually cannot be used to store much content of the lookup table. This can cause an additional latency penalty when reading compressed data using the lookup table cache.

Specifically, when the host system sends a request to read data, the memory sub-system controller can use the host memory address specified in the request to search in the lookup table cache and determine whether there is a cache hit or a cache miss in the lookup table cache. In the case of cache hit, the requested content associated with the host memory address is found in the lookup table cache; while in the case of cache miss, the requested content is missing from the lookup table cache. If the search results in a cache miss, the host system accesses the lookup table in the memory and fetches an entry, corresponding to the host memory address of the lookup table, into the lookup table cache. If the search results in a cache hit, the host system uses the host physical address to obtain the corresponding compressed address, the length of the compressed data, and the compression ratio, from the lookup table cache. The compressed data is then read using the compressed address (referencing the start location of the compressed data) and the length of the compressed data. The host system decompresses the compressed data and sends the decompressed data to the system or device requesting the data. As described above, the cache miss that requires an additional lookup and fetching step introduces latency and bandwidth overhead associated with the compression. As such, it is desirable for the size of the memory designated for the lookup table cache to be large enough to ensure a high cache hit rate. However, the storage capacity of the cache is ordinarily small compared to the capacity of the memory that is used for the lookup table. Further, determining whether to store particular data items in the cache is difficult because future access requests are often unpredictable.

In addition, the memory may be increasingly fragmented as memory accesses are performed out of order across the whole memory space and the compressed data are variable sized depending on compression ratio. It could be hard to find a contiguous memory space within the fragmented memory to fit the compressed data, thus resulting in non-optimal memory utilization. The non-optimal memory utilization would also require tracking the fragmented free space, for example, tracking the starting address and the length of the data, in a high cost.

Aspects of the present disclosure address the above and other deficiencies by implementing memory compression with an improved lookup table scheme. The improved lookup table scheme uses an improved lookup table to translate a host physical address to a compressed address for access operations on data in compressed forms. The improved lookup table can be used to store, instead of full addresses, identifiers associated with the memory. These identifiers can be used to reference a location, in the memory, that can be used as the compressed address. The improved lookup table requires a reduced size for storing, and as such, the improved lookup table scheme would provide a higher cache hit rate.

To implement the improved lookup table scheme, a memory compression manager in the sub-system controller can partition a memory into a set of memory partitions. The memory is designated for storing data at least some of which is in a compressed form. Each memory partition can be referenced by a corresponding partition identifier. The size of each memory partition is configurable. Memory compression manager can associate a range of compression ratio to the memory partition such that data stored in the memory partitions is compressed with a compression ratio falling in the range. The compression ratio (CR) refers to a ratio between the size of the data in a non-compressed form and in a compressed form (e.g., 2:1, 4:1, 8:1). Each memory partition corresponds to a range of the compression ratio (e.g., 2:1≤CR<4:1, 4:1≤CR<8:1, CR≥8:1). In some implementations, the sub-system controller can associate the range of the compression ratio to a memory partition at the time when the memory partition is allocated for use to store data.

The memory compression manager receives a request to write data in the memory, and the request may specify the host physical address. The memory compression manager may have the data compressed (e.g., by a compression component) and obtain a compression ratio that is used to compress the data. The memory compression manager identifies, based on the compression ratio, one memory partition of the set of memory partitions. In some implementations, the memory compression manager may determine that the compression ratio falls in a range of compression ratio and identify a memory partition associated with that range. The memory compression manager may obtain a partition identifier of the identified memory partition.

The memory compression manager then determines a location, in the identified memory partition, for storing the compressed data. For example, the memory compression manager may determine the location according to the available space in the identified memory partition. The location can be identifiable using a unit offset address and a segment identifier. Specifically, the memory compression manager may determine a unit offset address, in view of a compression ratio range associated with the memory partition, and determine a segment identifier specifying how many of the unit offset address to be shifted from the beginning address of the memory partition. The unit offset address refers to a unit address of the address to be shifted from the beginning address of the memory partition to the location used to store the compressed data. That is, the unit offset address equals the offset between the beginning addresses of neighboring segment identifiers. By using the partition identifier, the segment identifier, and the unit offset address, a location in the identified memory partition of the host memory for storing the compressed data can be identified. In some implementations, the location refers to a starting position for storing the compressed data and is chosen from a set of locations, and the set of locations is determined according to the compression ratio range associated with the memory partition. For example, the compression ratio range associated with the memory partition may indicate a minimum value within the compression ratio range, the number of the locations in the memory partition is determined according to the minimum value within the compression ratio range, and the offset between the neighboring locations of the set of the locations equals the unit offset address so that the set of locations divides the memory partition into equal sized segments.

As described above, the memory compression manager can obtain partition identifier of the identified memory partition and a segment identifier associated with the identified memory partition. The identifiers, when used with the unit offset address, can reference a location to store the compressed data (also referred to as compressed address). That is, the partition identifier can be used to reference the memory partition for storing the compressed data, and the segment identifier used with the unit offset address can reference the location within the memory partition that stores the compressed data. The memory compression manager may store the identifiers into the lookup table. Because the identifiers are small in size, the lookup table would also be in a small size. As such, when the memory compression manager use a lookup table cache, the lookup table cache can include most, if not all, of contents of the lookup table without much concern of the size limit.

In some implementations, the memory compression manager can further index the host physical address specified in the request and use the host physical address (HPA) index to sort in the lookup table. For each write request, the HPA index points to an entry in the lookup table, where the entry includes the partition identifier of the identified memory partition and the segment identifier associated with the identified memory partition. In some implementations, the memory compression manager can store, in the lookup table, a compression ratio value that can be used to obtain the unit offset address of the identified memory partition (e.g., the compression ratio used for compression the data, which can be used to derive the minimum value within the compression ratio range associated with the identified memory partition).

When the memory compression manager receives a request to read data that is stored in a compressed form, the request may specify the host physical address. The memory compression manager may determine, based on the host physical address, an HPA index. The host system controller may use the HPA index to locate an entry in the lookup table cache. Responsive to locating an entry in the lookup table cache, the host system controller may obtain the partition identifier, the segment identifier, and the compression ratio value for the unit offset address. The compression ratio value is used to obtain the unit offset address. The partition identifier is used to reference the memory partition for reading the compressed data, and the segment identifier with the unit offset address is used to reference the location within the memory partition to read the compressed data. As such, the memory compression manager may obtain a compressed address that references the location to read the compressed data.

Advantages of the present disclosure include reducing the amount of data stored in the lookup table cache such that a higher cache hit rate can be achieved with a small size of cache, and reducing operation complexity and latency by address shifting for the translation between the host physical address and the compressed address. Aspects of the present disclosure also improve the system performance through a higher cache hit rate and a simple address translation. Compared with existing memory compression scheme with longer latency and high bandwidth overhead, aspects of the present disclosure minimize the latency and the bandwidth overhead to enhance the value of memory compression with a lower cost.

Figure 1:
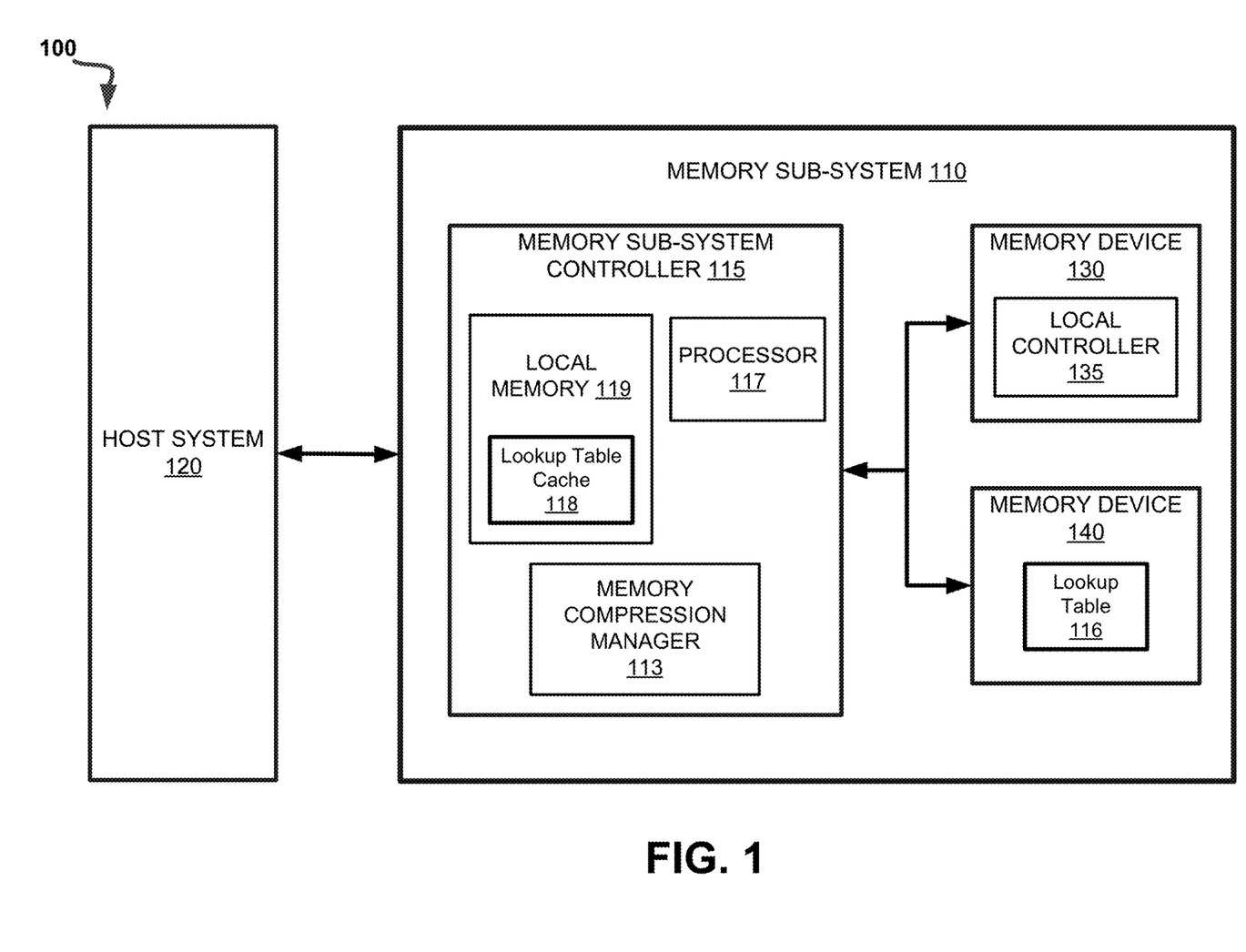
FIG. 1 illustrates an example computing system that includes a memory sub-system in accordance with some embodiments of the present disclosure.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a combination of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory modules (NVDIMMs).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some embodiments, the host system 120 is coupled to multiple memory sub-systems 110 of different types. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The NVMe interface is a communications interface/protocol developed for SSDs to operate over a host and a memory device that are linked over a PCIe interface. The NVMe protocol provides a command queue and completion path for access of data stored in memory devices by host system 220. In some embodiments, the interface between the host system and the memory device can implement one or more alternate protocols supported by another interface standard. For example, the interface can implement one or more alternate protocols supported by PCIe (e.g., non-PCIe protocols). In some embodiments, the interface can be represented by the compute express link (CXL) interface or any communication link that allows cache line granularity updates and shares coherency control with the processing device.

A CXL system is a cache-coherent interconnect for processors, memory expansion, and accelerators. A CXL system maintains memory coherency between the CPU memory space and memory on attached devices, which allows resource sharing for higher performance, reduced software stack complexity, and lower overall system cost. Generally, CXL is an interface standard that can support a number of protocols that can run on top of PCIe, including a CXL.io protocol, a CXL.mem protocol and a CXL.cache protocol. The CXL.io protocol is a PCIe-like protocol that can be viewed as an "enhanced" PCIe protocol capable of carving out managed memory. CXL.io can be used for initialization, link-up, device discovery and enumeration, register access, and can provide an interface for I/O devices. The CXL.mem protocol can enable host access to the memory of an attached device using memory semantics (e.g., load and store commands). This approach can support both volatile and persistent memory architectures. The CXL.cache protocol can define host-device interactions to enable efficient caching of host memory with low latency using a request and response approach. Traffic (e.g., NVMe traffic) can run through the CXL.io protocol, and the CXL.mem and CXL.cache protocols can share a common link layer and transaction layer. Accordingly, the CXL protocols can be multiplexed and transported via a PCIe physical layer.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include a not-and (NAND) type flash memory and write-in-place memory, such as a three-dimensional cross-point ("3D cross-point") memory device, which is a cross-point array of non-volatile memory cells. A cross-point array of non-volatile memory cells can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices 130 can include one or more arrays of memory cells such as SLCs, MLCs, TLCs, QLCs, PLCs or any combination of such. In some embodiments, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks. Some types of memory, such as 3D cross-point, can group pages across dice and channels to form management units (Mus).

Although non-volatile memory components such as a 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), not-or (NOR) flash memory, or electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processors.

The memory sub-system controller 115 can include a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some embodiments, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., a logical block address (LBA), namespace) and a physical address (e.g., physical MU address, physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some embodiments, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some embodiments, the memory devices 130 include local media controllers 135 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some embodiments, memory sub-system 110 is a managed memory device, which is a raw memory device 130 having control logic (e.g., local media controller 135) on the die and a controller (e.g., memory sub-system controller 115) for media management within the same memory device package. An example of a managed memory device is a managed NAND (MNAND) device.

In some embodiments, the memory device 140 includes a lookup table 116 used to store mapping information for compressed data, which will be illustrated in detail with respect to FIGS. 2-6. In some embodiments, a driver of memory sub-system controller 115 can allocate one or more portions of local memory 119 to be accessible faster (referred to herein as cache). In some implementations, a cache can include a lookup table cache 118, which is used to cache the content of the lookup table 116.

In some embodiments, the memory sub-system controller 115 includes a memory compression manager 113. In some embodiments, the memory compression manager 113 is part of an application, or an operating system. Further details regarding the operations of the memory compression manager 113 are described below with reference to FIGS. 2-6.

It will be appreciated by those skilled in the art that additional circuitry and signals can be provided, and that the components of FIG. 1 have been simplified. It should be recognized that the functionality of the various block components described with reference to FIG. 1 may not necessarily be segregated to distinct components or component portions of an integrated circuit device. For example, a single component or component portion of an integrated circuit device could be adapted to perform the functionality of more than one block component of FIG. 1. Alternatively, one or more components or component portions of an integrated circuit device could be combined to perform the functionality of a single block component of FIG. 1.

Figure 2:
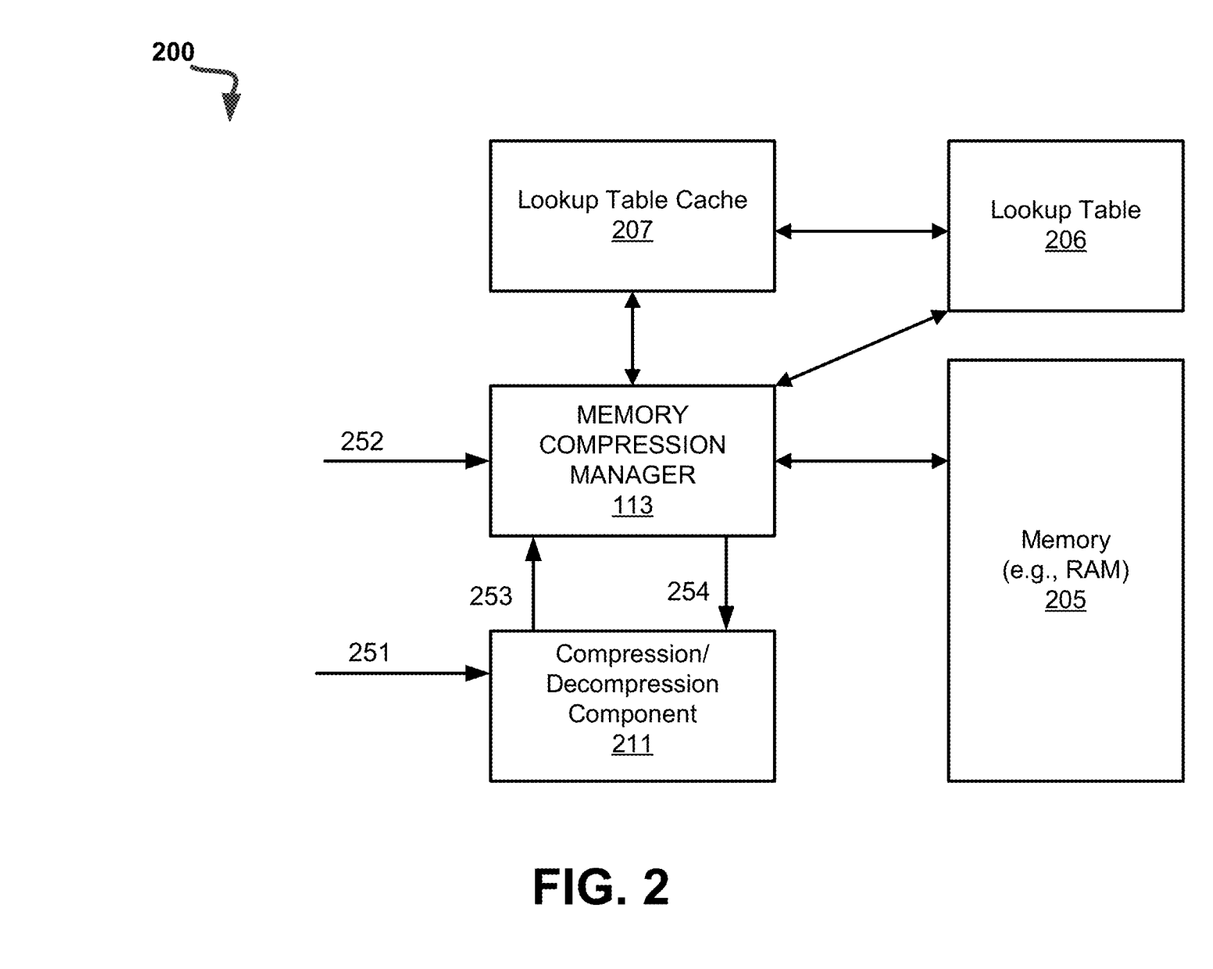
FIG. 2 is a block diagram of an example system for implementing memory compression with an improved lookup table scheme in accordance with some embodiments of the present disclosure.

FIG. 2 is a schematic block diagram of a system 200 implementing memory compression with an improved lookup table scheme. In various embodiments, the system 200 may be a memory sub-system (such as the memory sub-system 110). In various embodiments, the system 200 may include a memory compression manager 113, a compression/decompression component 211, a memory 205, a lookup table 206, and a lookup table cache 207. In some embodiments, aspects (to include hardware and/or firmware functionality) of the memory compression manager 113 is included in the compression/decompression component 211.

The compression/decompression component 211 can compress the data in a compressed form and/or decompress the compressed data. The compressed form can be generated by computer program instructions executed on a server computing device or by a memory sub-system, for example. Compression and decompression can be performed using a Lempel-Zip compressor or other suitable compression algorithm. The compression algorithm can be implemented using computer program instructions, hardware devices, or a combination thereof. Compression of data can be performed prior to storing the data in the memory 205. Similarly, decompression of data can be performed subsequent to retrieving the compressed form of the data from the memory 205. The compression and decompression operations can be performed in response to requests to store and retrieve data in the memory 205, respectively. Since the compressed form is stored in the memory 205, the same data item effectively uses less memory space in the memory 205 than in the non-compressed form. Because of the compression and decompression operations, data write and data read operations performed on the memory 205 ordinarily have greater latency than the data write and data read operations performed on the non-compressed form. The present disclosure illustrated with the system 200 can reduce the latency and reduce the processor usage introduced by the compression and decompression operations.

The memory 205 is designated for storing data at least some of which has been compressed. The memory 205 can be a volatile memory device, for example, RAM. The memory compression manager 113 can partition the memory 205 into a set of memory partitions, and each memory partition can be referenced by a corresponding partition identifier. The size of each memory partition is configurable. In some implementations, the size of each memory partition is the same. For example, the memory 205 has a size of 512 GB, the memory compression manager 113 partitions the memory 205 into 512 of 1 GB memory partition. The memory compression manager 113 can associate a range of compression ratio to the memory partition such that data stored in the memory partitions will have a compression ratio falling in the range. As such, each memory partition corresponds to a range of the compression ratio. In some implementations, the memory compression manager 113 can associate the range of the compression ratio to the memory partition at the time when the memory partition is allocated for use to store data.

Figure 3A:
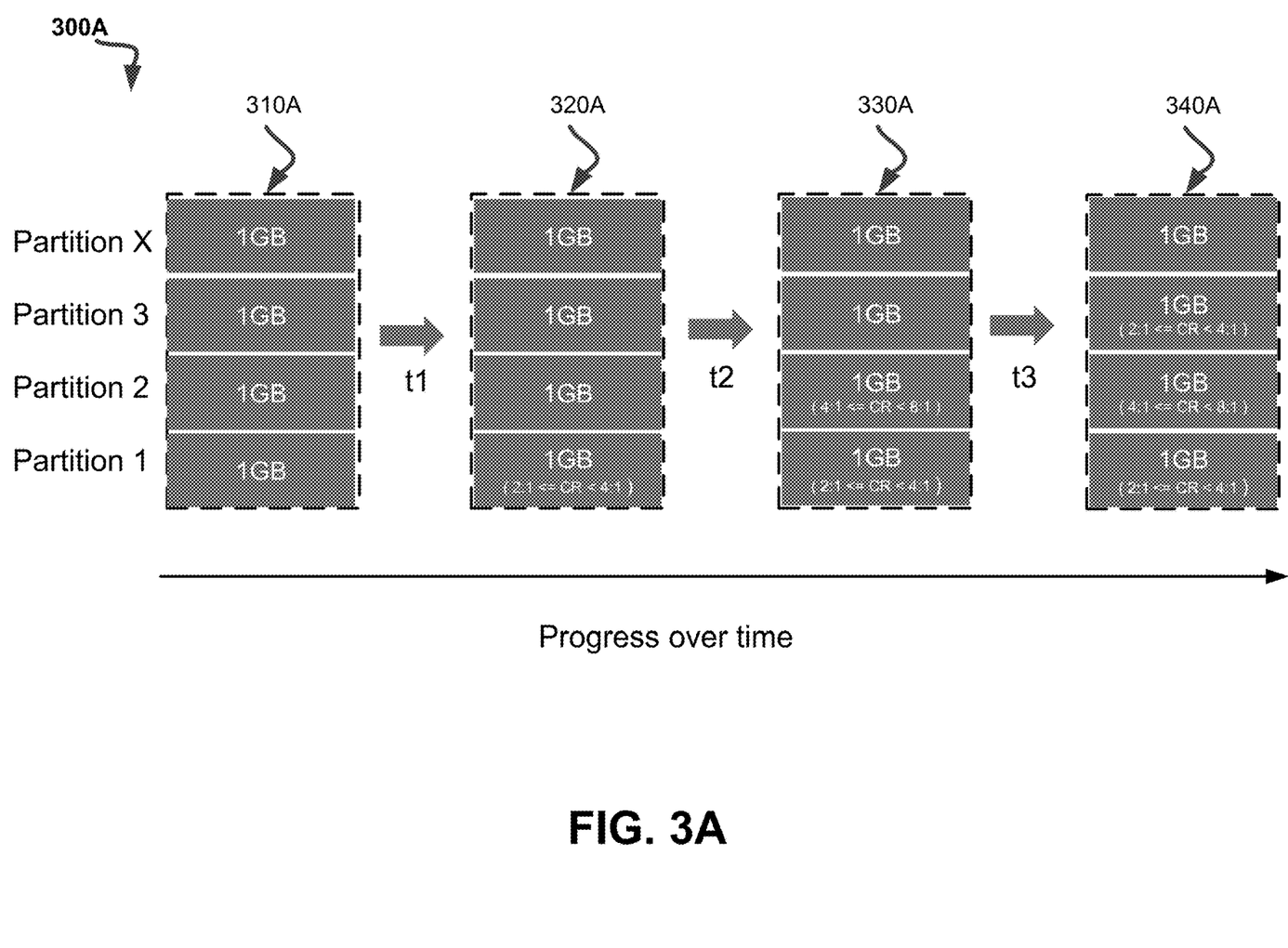
FIG. 3A illustrates an example of portioning memory for implementing memory compression in accordance with some embodiments of the present disclosure.

As an example, illustrated in FIG. 3A, the memory compression manager 113 can partition the memory 205 into multiple memory partitions, where each memory partition is identifiable by a corresponding partition identifier—partition 1, partition 2, partition 3, or partition X. At the beginning of the time, within the partitions 310A, partition 1, partition 2, partition 3, and partition X are not yet allocated for use. At the time t1, within the partitions 320A, partition 1 is allocated for use, for example, when the memory compression manager 113 receives a request for access data, where the data has been compressed under a compression ratio within a first range (e.g., 2:1≤CR<4:1). The memory compression manager 113 thus associates the first range of the compression ratio to partition 1. Partition 1 will be used to store the compressed data responsive to the request. At the time t1, within the partitions 320A, partition 2, partition 3, and partition X are not yet allocated for use. When the memory compression manager 113 receives another request for access data, where the data also has been compressed under a compression ratio within the first range, partition 1 will be used to store the compressed data responsive to this request if the partition 1 has not reached its maximum storage capacity.

At the time t2, within the partitions 330A, partition 2 is allocated for use, for example, when the memory compression manager 113 receives a request for access data, where the data has been compressed under a compression ratio within a second range (e.g., 4:1≤CR<8:1). The memory compression manager 113 thus associates the second range of the compression ratio to partition 2. Partition 2 will be used to store the compressed data responsive to the request. At the time t2, within the partitions 330A, partition 3 and partition X are not yet allocated for use. When the memory compression manager 113 receives another request for access data, where the data also has been compressed under a compression ratio within the second range, partition 2 will be used to store the compressed data responsive to this request if the partition 2 has not reached its maximum storage capacity.

At the time t3, within the partitions 340A, partition 3 is allocated for use, for example, when the memory compression manager 113 receives a request for access data, where the data has been compressed under a compression ratio within the first range (e.g., 2:1≤CR<4:1), but partition 1 has reached its maximum storage capacity. The memory compression manager 113 thus associates the first range of the compression ratio to partition 3. Partition 3 will be used to store the compressed data responsive to the request. At the time t3, within the partitions 340A, partition X is not yet allocated for use. When the memory compression manager 113 receives another request for access data, where the data also has been compressed under a compression ratio within the first range, partition 3 will be used to store the compressed data responsive to this request if the partition 3 has not reached its maximum storage capacity.

Referring back to FIG. 2, a request 251 to write data is received by the compression/decompression component 211. The write request 251 may include the data to be compressed. The write request 251 may specify the host physical address. In some implementations, the compression/decompression component 211 may compress the data and obtain a compression ratio of the compressed data. In some implementations, the compression/decompression component 211 may determine a compression ratio and compress the data accordingly. The compression/decompression component 211 may send a request 253 to memory compression manager 113 to store the compressed data. The request 253 may specify the compression ratio associated with the compressed data.

Figure 3B:
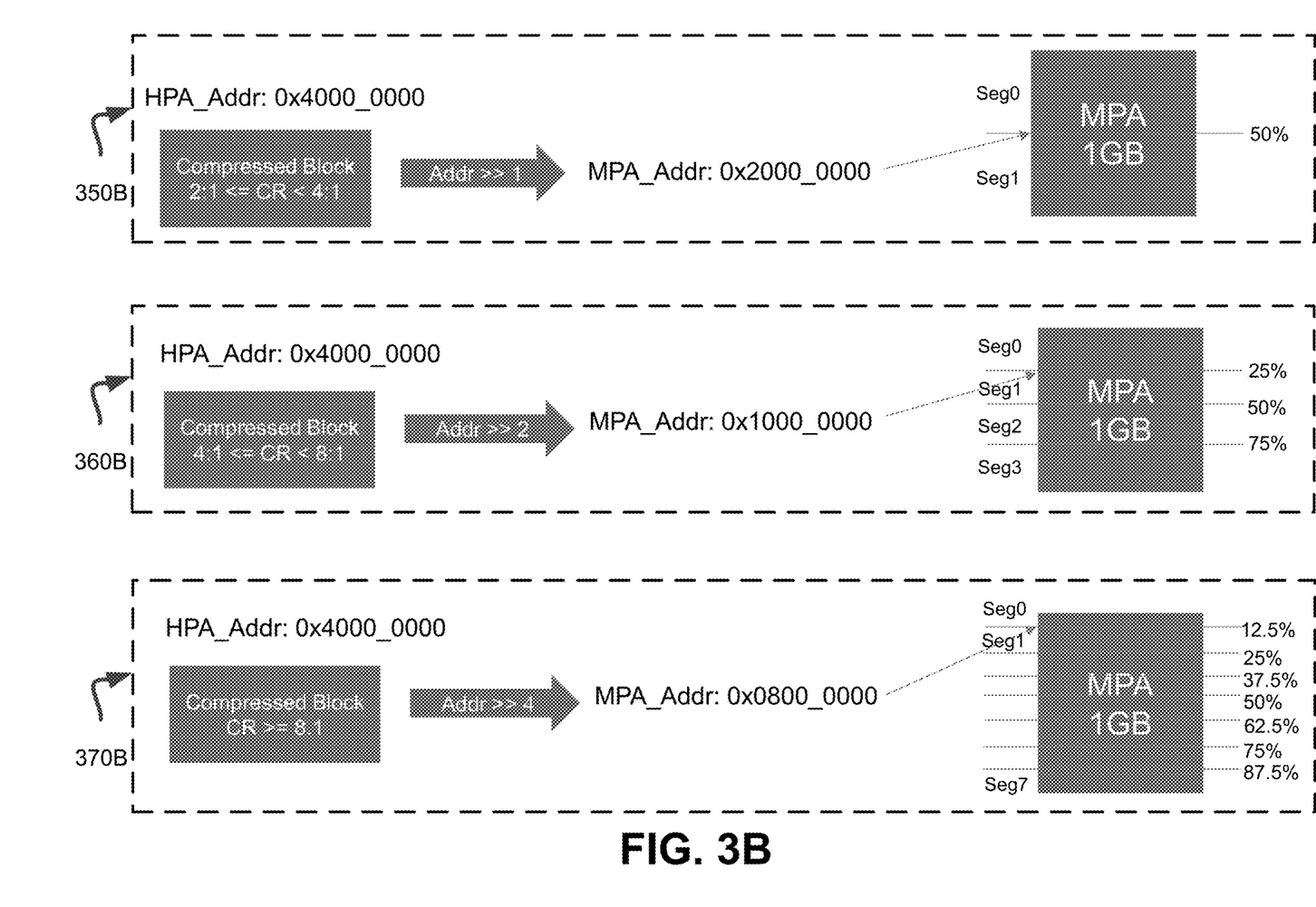
FIG. 3B illustrates an example of memory segments for implementing memory compression in accordance with some embodiments of the present disclosure.

The memory compression manager 113 may identify, based on the compression ratio, one memory partition of the set of memory partitions. The memory compression manager 113 may determine that the compression ratio specified in the request 253 falls in a range of compression ratio, and identify a memory partition associated with that range. For example, as shown in FIG. 3B, the first range of the compression ratio may be a value larger than or equal to 2 but smaller than 4 (i.e., 2:1≤CR<4:1), the second range of the compression ratio may be a value larger than or equal to 4 but smaller than 8 (i.e., 4:1≤CR<8:1), and the third range of the compression ratio may be a value larger than 8 (i.e., CR≥8:1). The memory compression manager 113 may determine that the compression ratio specified in the request 253 falls in the first range, and identify the memory partition associated with the first range as shown in the graph 350B. The memory compression manager 113 may determine that the compression ratio specified in the request 253 falls in the second range, and identify the memory partition associated with the second range as shown in the graph 360B. The memory compression manager 113 may determine that the compression ratio specified in the request 253 falls in the third range, and identify the memory partition associated with the third range as shown in the graph 370B. The memory compression manager 113 may obtain a partition identifier of the identified memory partition.

The memory compression manager 113 then determines a location, in the identified memory partition, for storing the compressed data. For example, the memory compression manager 113 may determine the location according to the available space in the identified memory partition. The location can be identifiable using a unit offset address and a segment identifier. Specifically, the memory compression manager 113 may determine a unit offset address, in view of a compression ratio range associated with the memory partition, and determine a segment identifier specifying how many of the unit offset address to be shifted. By using the partition identifier, the segment identifier, and the unit offset address, a location in the identified memory partition of the memory 205 for storing the compressed data can be identified. In some implementations, the location refers to a starting position for storing the compressed data and is chosen from a set of locations, and the set of locations is determined according to the compression ratio range associated with the memory partition. In some implementations, the number of the locations in a memory partition is determined according to the minimum value within the range of compression ratio, and the offset between the locations equals the unit offset address so that the locations divide the memory partition into equal-size segments.

For example, as the diagram 350B shown in FIG. 3B, when the memory partition is associated with the first range of the compression ratio (i.e., 2:1≤CR<4:1), the number of the locations, thus the number of the segments of the memory partition equals to the minimum value (i.e., 2) of the first range. In the example, the two locations include the address [0X4000_0000] and the address [0X2000_0000], where the address [0X4000_0000] is a modified physical address corresponding to a beginning location of a second segment (e.g., Seg1) of the memory partition, and the address [0X2000_0000] is a modified physical address corresponding to a beginning location of a first segment (e.g., Seg0) of the identified memory partition. In the example, the two-segment configuration is determined based on the 2:1 compression ratio scenario. The address [0X2000_0000] is a shift of one bit from the address [0X4000_0000], and the shift corresponds to the unit offset address, which is [0X2000_0000].

When the memory compression manager 113 receives the request 253, if the memory partition has not been used or the first segment of the memory partition has the capacity to store the compressed data in the request 253, the memory compression manager 113 may identify the location for storing the compressed data to be the beginning location of the first segment of the memory partition. Thus, the memory compression manager 113 may obtain a segment identifier referencing to the second segment (e.g., Seg1). The memory compression manager 113 can then calculate the location by, for example, multiplying a value of the segment identifier with the unit offset address (e.g., multiplying 2 with [0X2000_0000]) and determine the calculated location as a location in the memory partition of the memory 205 for storing the compressed data.

When the memory compression manager 113 receives the request 253, if the memory partition has been used or the first segment of the memory partition has reached its maximum capacity, the memory compression manager 113 may identify the location for storing the compressed data to be the beginning location of the second segment of the memory partition. Thus, the memory compression manager 113 may obtain a segment identifier referencing to the first segment (e.g., Seg0). The memory compression manager 113 can then calculate the location by, for example, multiplying a value of the segment identifier with the unit offset address (e.g., multiplying 1 with [0X2000_0000]) and determine the calculated location as a location in the memory partition of the memory 205 for storing the compressed data.

For the second range, the locations include the address [0X4000_0000], the address [0X3000_0000], the address [0X2000_0000], and the address [0X1000_0000], where the address [0X4000_0000] is a modified physical address corresponding to a beginning address of a fourth segment (e.g., Seg3) of the identified memory partition, the address [0X3000_0000] is a modified physical address corresponding to a beginning address of a third segment (e.g., Seg2) of the identified memory partition, the address [0X2000_0000] is a modified physical address corresponding to a beginning address of a second segment (e.g., Seg1) of the identified memory partition, and the address [0X1000_0000] is a modified physical address corresponding to a beginning address of a first segment (e.g., Seg0) of the identified memory partition. The four-segment configuration is determined based on the 4:1 compression ratio scenario, which corresponds to the least compression scenario within the range. The address [0X1000_0000] is a shift of two bits from the address [0X4000_0000]. For the third range, the locations include eight addresses, where each address corresponds to a beginning address of a segment, and the memory partition includes eight segments. The eight-segment configuration is determined based on the 8:1 compression ratio scenario, which corresponds to the least compression scenario within the range. The address [0X0800_0000] is a shift of four bits from the address [0X4000_0000].

As the diagram 360B shown in FIG. 3B, when the memory partition is associated with the second range of the compression ratio (i.e., 4:1≤CR<8:1), the number of the locations, thus the number of the segments of the memory partition equals to the minimum value (i.e., 4) of the second range. In the example, the four locations include the address [0X4000_0000], the address [0X3000_0000], the address [0X2000_0000], and the address [0X1000_0000], where the address [0X4000_0000] is a modified physical address corresponding to a beginning location of a fourth segment (e.g., Seg3) of the memory partition, the address [0X3000_0000] is a modified physical address corresponding to a beginning location of a third segment (e.g., Seg2) of the memory partition, the address [0X2000_0000] is a modified physical address corresponding to a beginning location of a second segment (e.g., Seg1) of the memory partition, and the address [0X1000_0000] is a modified physical address corresponding to a beginning location of a first segment (e.g., Seg0) of the identified memory partition. In the example, the four-segment configuration is determined based on the 4:1 compression ratio scenario. The address [0X1000_0000] is a shift of two bits from the address [0X4000_0000], and the shift corresponds to the unit offset address, which is [0X1000_0000].

When the memory compression manager 113 receives the request 253, if the memory partition has not been used or the first segment of the memory partition has the capacity to store the compressed data in the request 253, the memory compression manager 113 may identify the location for storing the compressed data to be the beginning location of the first segment of the memory partition. Thus, the memory compression manager 113 may obtain a segment identifier referencing to the fourth segment (e.g., Seg3). The memory compression manager 113 can then calculate the location by, for example, multiplying a value of the segment identifier with the unit offset address (e.g., multiplying 4 with [0X1000_0000]) and determine the calculated location as a location in the memory partition of the memory 205 for storing the compressed data.

When the memory compression manager 113 receives the request 253, if the memory partition has been used or the first segment of the memory partition has reached its maximum capacity, the memory compression manager 113 may identify the location for storing the compressed data to be the beginning location of the second segment of the memory partition. Thus, the memory compression manager 113 may obtain a segment identifier referencing to the third segment (e.g., Seg2). The memory compression manager 113 can then calculate the location by, for example, multiplying a value of the segment identifier with the unit offset address (e.g., multiplying 3 with [0X1000_0000]) and determine the calculated location as a location in the memory partition of the memory 205 for storing the compressed data.

When the memory compression manager 113 receives the request 253, if the first segment and the second segment of the memory partition have reached their maximum capacity, the memory compression manager 113 may identify the location for storing the compressed data to be the beginning location of the third segment of the memory partition. Thus, the memory compression manager 113 may obtain a segment identifier referencing to the second segment (e.g., Seg1). The memory compression manager 113 can then calculate the location by, for example, multiplying a value of the segment identifier with the unit offset address (e.g., multiplying 2 with [0X1000_0000]) and determine the calculated location as a location in the memory partition of the memory 205 for storing the compressed data.

When the memory compression manager 113 receives the request 253, if the first segment, the second segment, and the third segment of the memory partition have reached their maximum capacity, the memory compression manager 113 may identify the location for storing the compressed data to be the beginning location of the fourth segment of the memory partition. Thus, the memory compression manager 113 may obtain a segment identifier referencing to the first segment (e.g., Seg0). The memory compression manager 113 can then calculate the location by, for example, multiplying a value of the segment identifier with the unit offset address (e.g., multiplying 1 with [0X1000_0000]) and determine the calculated location as a location in the memory partition of the memory 205 for storing the compressed data.

As the diagram 370B shown in FIG. 3B, when the memory partition is associated with the third range of the compression ratio (i.e., CR≥8:1), the number of the locations, thus the number of the segments of the memory partition equals to the minimum value (i.e., 8) of the third range. In the example, the eight locations include the address [0X4000_0000], the address [0X3800_0000], the address [0X3000_0000], the address [0X2800_0000], the address [0X2000_0000], the address [0X1800_0000], the address [0X1000_0000], and the address [0X0800_0000], where the address [0X4000_0000] is a modified physical address corresponding to a beginning location of a eighth segment (e.g., Seg7) of the memory partition, the address [0X3800_0000] is a modified physical address corresponding to a beginning location of a seventh segment (e.g., Seg6) of the memory partition, the address [0X3000_0000] is a modified physical address corresponding to a beginning location of a sixth segment (e.g., Seg5) of the memory partition, the address [0X2800_0000] is a modified physical address corresponding to a beginning location of a fifth segment (e.g., Seg4) of the memory partition, the address [0X2000_0000] is a modified physical address corresponding to a beginning location of a fourth segment (e.g., Seg3) of the memory partition, the address [0X1800_0000] is a modified physical address corresponding to a beginning location of a third segment (e.g., Seg2) of the memory partition, the address [0X1000_0000] is a modified physical address corresponding to a beginning location of a second segment (e.g., Seg1) of the identified memory partition, and the address [0X0800_0000] is a modified physical address corresponding to a beginning location of an first segment (e.g., Seg0) of the identified memory partition. In the example, the eight-segment configuration is determined based on the 8:1 compression ratio scenario. The address [0X0800_0000] is a shift of four bits from the address [0X4000_0000], and the shift corresponds to the unit offset address, which is [0X0800_0000].

When the memory compression manager 113 receives the request 253, if the memory partition has not been used or the first segment of the memory partition has the capacity to store the compressed data in the request 253, the memory compression manager 113 may identify the location for storing the compressed data to be the beginning location of the first segment of the memory partition. Thus, the memory compression manager 113 may obtain a segment identifier referencing to the eighth segment (e.g., Seg7). The memory compression manager 113 can then calculate the location by, for example, multiplying a value of the segment identifier with the unit offset address (e.g., multiplying 8 with [0X0800_0000]) and determine the calculated location as a location in the memory partition of the memory 205 for storing the compressed data.

When the memory compression manager 113 receives the request 253, if the memory partition has been used or the first segment of the memory partition has reached its maximum capacity, the memory compression manager 113 may identify the location for storing the compressed data to be the beginning location of the second segment of the memory partition. Thus, the memory compression manager 113 may obtain a segment identifier referencing to the seventh segment (e.g., Seg6). The memory compression manager 113 can then calculate the location by, for example, multiplying a value of the segment identifier with the unit offset address (e.g., multiplying 7 with [0X0800_0000]) and determine the calculated location as a location in the memory partition of the memory 205 for storing the compressed data.

The processes for determining the sixth segment (e.g., Seg5) and the corresponding location (e.g., multiplying 6 with [0X0800_0000]), the fifth segment (e.g., Seg4) and the corresponding location (e.g., multiplying 5 with [0X0800_0000]), the fourth segment (e.g., Seg3) and the corresponding location (e.g., multiplying 4 with [0X0800_0000]), the third segment (e.g., Seg2) and the corresponding location (e.g., multiplying 3 with [0X0800_0000]), the second segment (e.g., Seg1) and the corresponding location (e.g., multiplying 2 with [0X0800_0000]), and the first segment (e.g., Seg0) and the corresponding location (e.g., multiplying 1 with [0X0800_0000]) are similar as described above.

Referring back to FIG. 2, for the request 253, the memory compression manager 113 may obtain partition identifier of the identified memory partition and a segment identifier associated with the identified memory partition. The identifiers, when used with the unit offset address, can reference a location to store the compressed data (also referred to as compressed address). That is, the partition identifier can be used to reference the memory partition for storing the compressed data, and the segment identifier used with the unit offset address can reference the location within the memory partition that stores the compressed data. The memory compression manager 113 may store the identifiers into the lookup table 206. Because the identifiers are small in size, the lookup table 206 would also be in a small size. For example, assuming a memory device in a size of 512 GB are divided into 512 memory partitions, each memory partition in a size of 1 GB. The partition identifier needs only 9 bits spaces. For an eight-segment configuration, the segment identifier needs only 3 bits spaces. As such, when the memory compression manager 113 use a cache, e.g., a lookup table cache 207, the lookup table cache 207 can include most, if not all, of contents of the lookup table 206 without much concern of the size limit. In some implementations, the lookup table 206 can be stored in DRAM, and the lookup table cache 207 can be stored in SRAM. In some implementations, the lookup table 206 can be stored in a same device with the memory 205.

Figure 4:
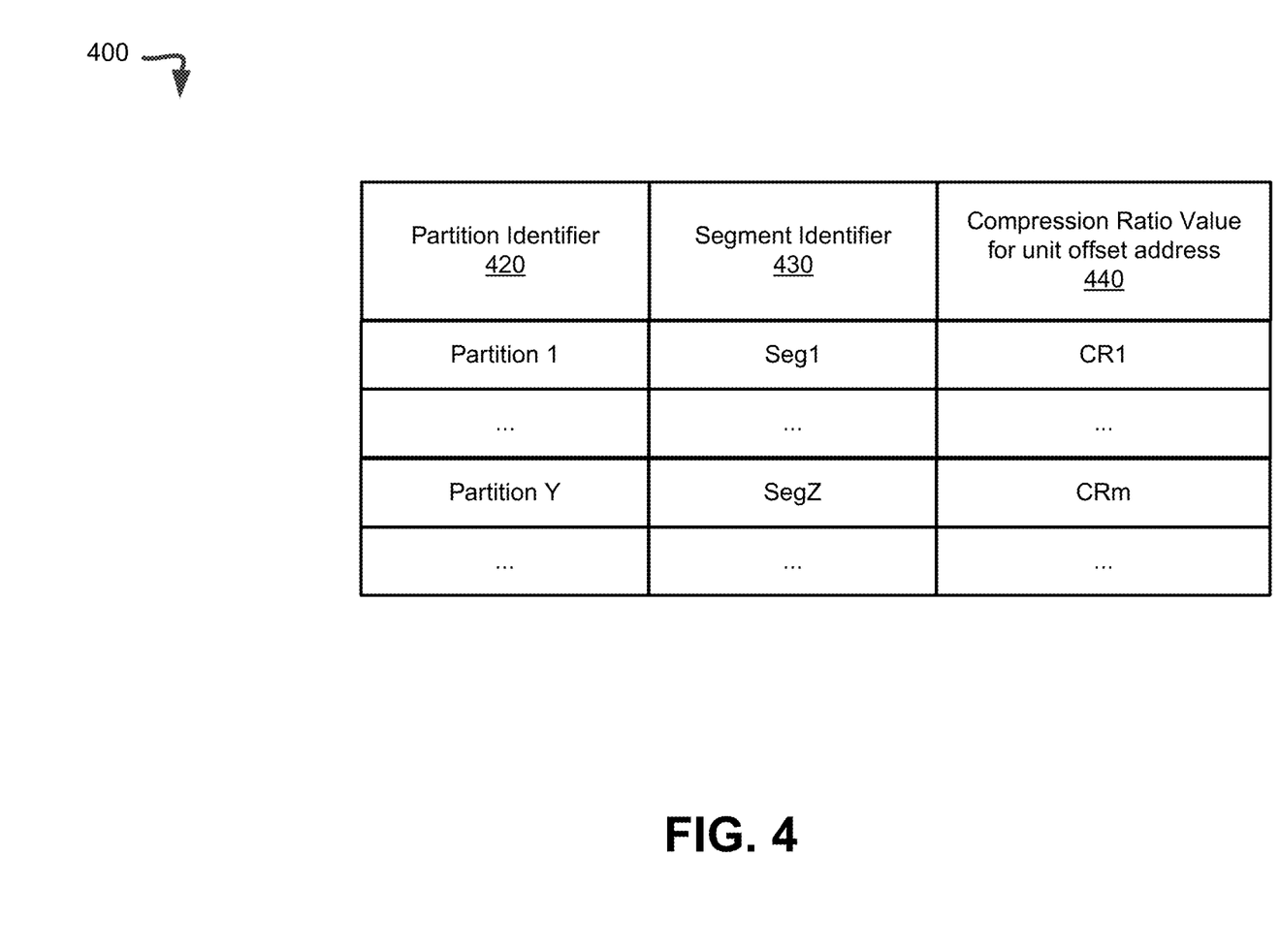
FIG. 4 illustrates an example of data structure for implementing memory compression in accordance with some embodiments of the present disclosure.

The memory compression manager 113 can further index the host physical address specified in the request 253 and use a host physical address (HPA) index to sort in the lookup table 260. For the request 253, the HPA index points to an entry in the lookup table 260, where the entry includes the partition identifier of the identified memory partition and the segment identifier associated with the identified memory partition. In some implementations, the memory compression manager 113 can store, in the lookup table 206, the compression ratio value (e.g., 2:1 in the graph 350B, 4:1 in the graph 360B, 8:1 in the graph 370B) that is associated with the unit offset address of the identified memory partition. In some implementations, the compression ratio value stored in the lookup table 206 is the same as the compression ratio used to compress the data in the request 253. FIG. 4 illustrates an example lookup table 400. The lookup table 400 include multiple records. Each record can correspond to a request for storing compressed data. Each record includes a partition identifier 420, a segment identifier 430, and a compression ratio value (for the unit offset address) 440.

Referring back to FIG. 2, a request 252 to read data is received by the memory compression manager 113. The read request 252 may specify the host physical address that indicates where the data to be read is located. The memory compression manager 113 may determine, based on the host physical address, an PHA index. The memory compression manager 113 may use the PHA index to locate an entry in the lookup table cache 207. Responsive to locating an entry in the lookup table cache 207, the memory compression manager 113 may obtain, in the entry, the partition identifier, the segment identifier, and the compression ratio value for the unit offset address. The compression ratio value is used to obtain the unit offset address as described with respect to FIG. 3B. The partition identifier is used to reference the memory partition for reading the compressed data, and the segment identifier with the unit offset address is used to reference the location within the memory partition to read the compressed data. As such, the memory compression manager 113 may obtain a compressed address that references the location to read the compressed data.

In the example of diagram 350B in FIG. 3B, the compression ratio 2:1 is used to obtain the unit offset address [0X2000_0000]; assuming the partition number is Partition 1, and the segment identifier is Seg 0, the compressed address can be expressed as "Partition 1 && Seg0 && [0X2000_0000]", which references the location of 50% line of the block in the graph 350B. In the example of diagram 360B in FIG. 3B, the compression ratio 4:1 is used to obtain the unit offset address [0X1000_0000]; assuming the partition number is Partition 1, and the segment identifier is Seg 0, the compressed address can be expressed as "Partition 1 && Seg0 && [0X1000_0000]", which references the location of 25% line of the block in the graph 360B. In the example of diagram 370B in FIG. 3B, the compression ratio 8:1 is used to obtain the unit offset address [0X0800_0000]; assuming the partition number is Partition 1, and the segment identifier is Seg 0, the compressed address can be expressed as "Partition 1 && Seg0 && [0X0800_0000]", which references the location of 12.5% line of the block in the graph 370B.

Referring back to FIG. 2, the memory compression manager 113 may access the memory 205 at the location referenced by the compressed address and read the compressed data, and send the compressed data 254 to the compression/decompression component 211 to decompress the compressed data.

In some implementations, a certain range of the compression ratio may be used more often than other ranges. For example, in FIGS. 3A and 3B, the first range (e.g., $2:1 \leq CR < 4:1$) can be used more often than the second range (e.g., $4:1 \leq CR < 8:1$) and the third range (e.g., $CR \geq 8:1$). As such, more memory partitions will be associated with a certain range than other ranges of the compression ratio, and this can help in limiting the number of different compression ratio ranges used in the memory compression, thus reducing the complexity in configuring the lookup table.

Figure 5:
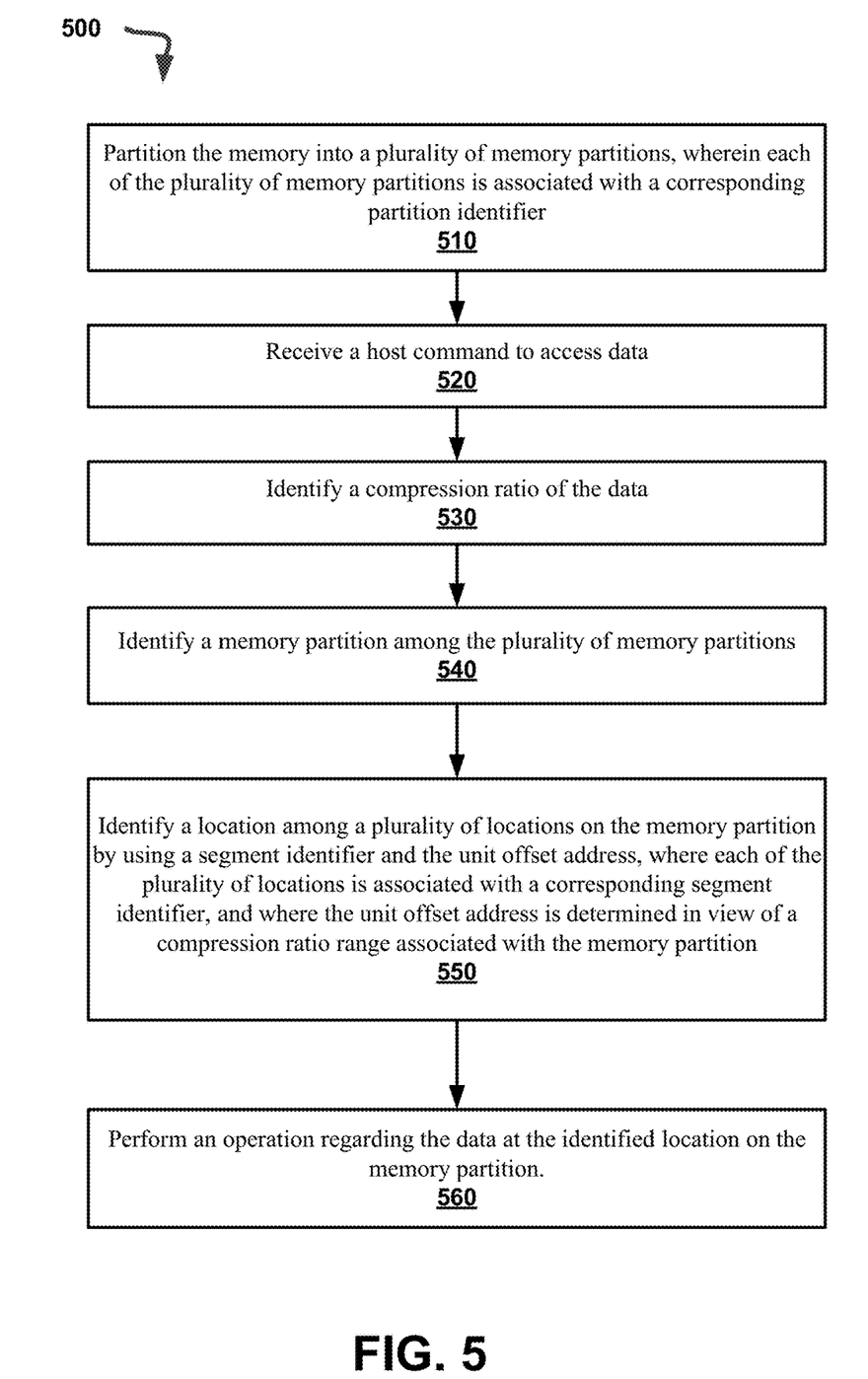
FIG. 5 is a flow diagram of an example method for implementing memory compression with an improved lookup table scheme in accordance with some embodiments of the present disclosure.

FIG. 5 is a flow diagram of an example method 500 for implementing memory compression with an improved lookup table scheme, in accordance with some embodiments of the present disclosure. The method 500 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by the memory compression manager 113 of FIG. 1 and FIG. 2. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 510, the processing logic can partition the memory into a plurality of memory partitions, wherein each of the plurality of memory partitions is associated with a corresponding partition identifier. In some implementations, the memory may be the host memory 105 of FIG. 1 or the memory 205 of FIG. 2. In some implementations, the processing logic can associate a compression ratio range to the memory partition. In some implementations, the processing logic can associate a compression ratio range to the memory partition responsive to receiving a first data access request directed to the memory partition. In some implementations, the memory is a volatile memory device.

At operation 520, the processing logic can receive a host command to access (e.g., write or read) data. In some implementations, the host command specifies a host physical address. At operation 530, the processing logic can identify a compression ratio of the data. In some implementations, the processing logic identifies the compression ratio by calculating the compression ratio of the compressed data after the data has been compressed. In some implementations, the processing logic identifies the compression ratio by searching in a lookup table or lookup table cache, for example, when the host command is a command for reading and specifies a host physical address that can be used to index in the lookup table or lookup table cache.

At operation 540, the processing logic can identify a memory partition among the plurality of memory partitions. In some implementations, the processing logic determines whether the compression ratio of the data falls in a compression ratio range. In some implementations, responsive to determining that the compression ratio of the data falls in the compression ratio range, the processing logic identifies the memory partition among the plurality of memory partitions. In some implementations, the processing logic obtains a partition identifier of the identified memory partition. In some implementations, the processing logic can identify a partition identifier by searching in a lookup table or lookup table cache, for example, when the host command is a command for reading and specifies a host physical address that can be used to index in the lookup table or lookup table cache, and identify the memory partition by using the partition identifier.

At operation 550, the processing logic can identify a location among a plurality of locations on the memory partition by using a segment identifier and the unit offset address, where each of the plurality of locations is associated with a corresponding segment identifier, and where the unit offset address is determined in view of a compression ratio range associated with the memory partition. In some implementations, the plurality of locations on the memory partition are determined based on the compression ratio range associated with the memory partition. In some implementations, the plurality of locations on the memory partition are determined based on a minimum value of a compression ratio range associated with the memory partition. In some implementations, the distances between neighbor locations of plurality of locations on the memory partition are the same. In some implementations, the number of locations on the memory partition equals a minimum value of a compression ratio range associated with the memory partition.

In some implementations, the processing logic can store, in a data structure, a record indexable by a physical address specified in the host command, wherein the record includes a partition identifier of the memory partition and the segment identifier. In some implementations, the record includes a value in the compression ratio range associated with the memory partition. In some implementations, the processing logic can cache the data structure.

At operation 560, the processing logic can perform an operation regarding the data at the identified location on the memory partition. The operation may write the data at the identified location on the memory partition, where the data is in a compressed form. The operation may read the data at the identified location on the memory partition, where the data is in a compressed form; the read data can be then decompressed.

Figure 6:
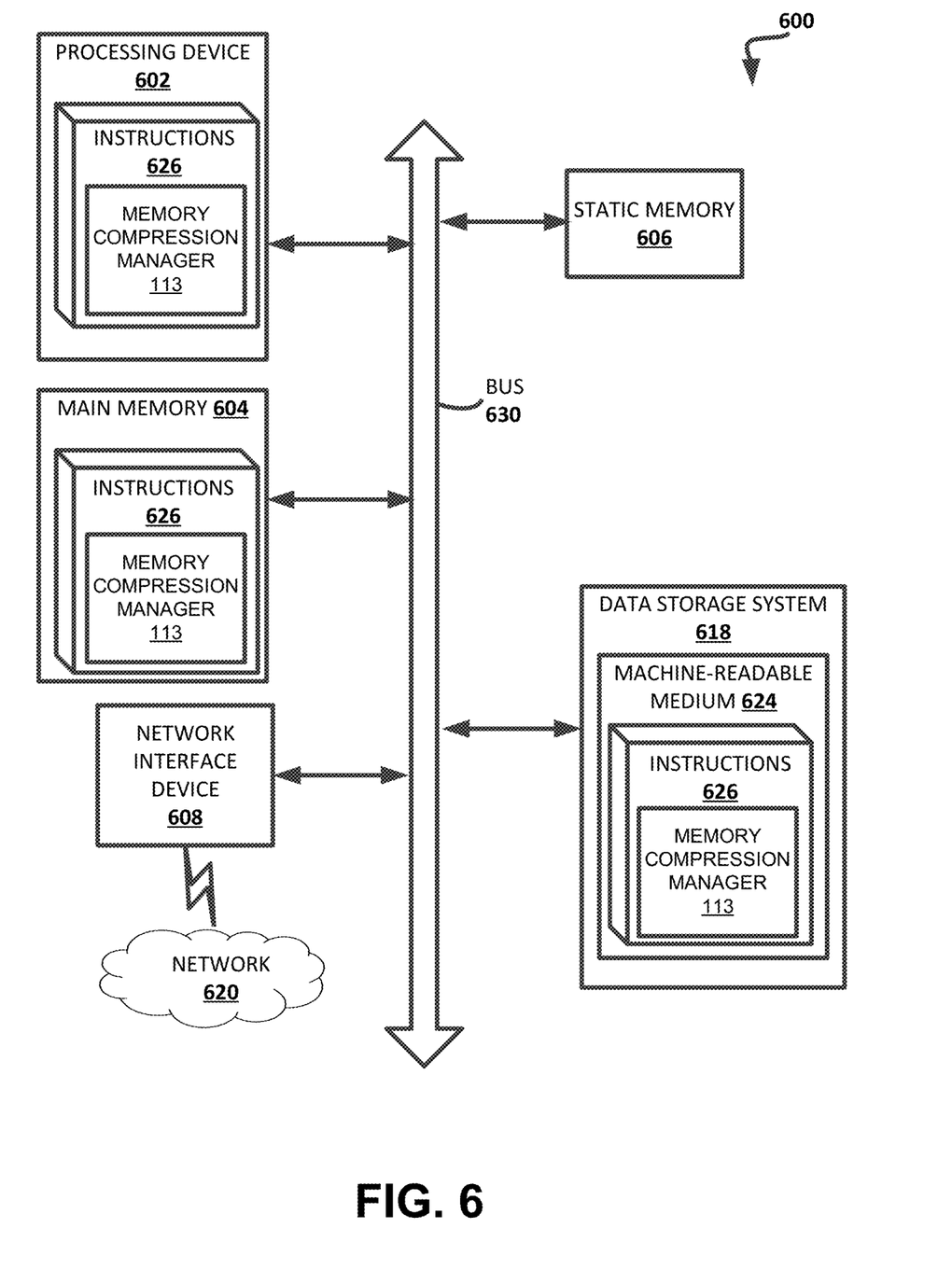
FIG. 6 is a block diagram of an example computer system in which embodiments of the present disclosure may operate.

FIG. 6 illustrates an example machine of a computer system 600 within which a set of instructions, for causing the machine to perform any one or more of the methodologies discussed herein, can be executed. In some embodiments, the computer system 600 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the memory compression manager 113 of FIG. 1 and FIG. 2). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or RDRAM, etc.), a static memory 606 (e.g., flash memory, static random access memory (SRAM), etc.), and a data storage system 618, which communicate with each other via a bus 630. In some implementations, the main memory 604 may be the host memory 105 of FIG. 1 or the memory 205 of FIG. 2.

Processing device 602 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be one or more special-purpose processing devices such as an application specific integrated circuit (ASIC), a field programmable gate array (FPGA), a digital signal processor (DSP), network processor, or the like. The processing device 602 is configured to execute instructions 626 for performing the operations and steps discussed herein. The computer system 600 can further include a network interface device 608 to communicate over the network 620.

The data storage system 618 can include a machine-readable storage medium 624 (also known as a computer-readable medium) on which is stored one or more sets of instructions 626 or software embodying any one or more of the methodologies or functions described herein. The instructions 626 can also reside, completely or at least partially, within the main memory 604 and/or within the processing device 602 during execution thereof by the computer system 600, the main memory 604 and the processing device 602 also constituting machine-readable storage media. The machine-readable storage medium 624, data storage system 618, and/or main memory 604 can correspond to the memory sub-system 110 of FIG. 1.

In one embodiment, the instructions 626 include instructions to implement functionality corresponding to a memory management component (e.g., the memory compression manager 113 of FIG. 1 and FIG. 2). While the machine-readable storage medium 624 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A system comprising:
    a memory; and
    a processing device, operatively coupled with the memory, to perform operations comprising:
        partitioning the memory into a plurality of memory partitions, wherein each of the plurality of memory partitions is associated with a corresponding partition identifier;
        receiving a host command to access data;
        identifying a compression ratio of the data;
        identifying a memory partition among the plurality of memory partitions;
        identifying a location among a plurality of locations on the memory partition by using a segment identifier and a unit offset address, wherein each of the plurality of locations is associated with a corresponding segment identifier, and wherein the unit offset address is determined in view of a compression ratio range associated with the memory partition; and
        performing an operation regarding the data at the identified location on the memory partition.

2. The system of claim 1, wherein the processing device is to perform operations further comprising:
    storing, in a data structure, a record indexable by a physical address specified in the host command, wherein the record includes a partition identifier of the memory partition and the segment identifier.

3. The system of claim 2, wherein the record includes a value in the compression ratio range associated with the memory partition.

4. The system of claim 2, wherein the processing device is to perform operations further comprising:
    caching the data structure.

5. The system of claim 1, wherein the processing device is to perform operations further comprising:
    associating the compression ratio range to the memory partition.

6. The system of claim 5, wherein identifying the memory partition among the plurality of memory partitions further comprises: determining that the compression ratio of the data falls in the compression ratio range.

7. The system of claim 1, wherein the plurality of locations on the memory partition are determined based on the compression ratio range associated with the memory partition.

8. The system of claim 1, wherein the memory comprises at least one of: a volatile memory device or a non-volatile memory device.

9. A method comprising:
    partitioning, by a processing device, a memory into a plurality of memory partitions, wherein each of the plurality of memory partitions is associated with a corresponding partition identifier;
    receiving a host command to access data;
    identifying a compression ratio of the data;
    identifying a memory partition among the plurality of memory partitions;
    identifying a location among a plurality of locations on the memory partition by using a segment identifier and a unit offset address, wherein each of the plurality of locations is associated with a corresponding segment identifier, and wherein the unit offset address is determined in view of a compression ratio range associated with the memory partition; and
    performing an operation regarding the data at the identified location on the memory partition.

10. The method of claim 9, further comprising:
    storing, in a data structure, a record indexable by a physical address specified in the host command, wherein the record includes a partition identifier of the memory partition and the segment identifier.

11. The method of claim 10, wherein the record includes a value in the compression ratio range associated with the memory partition.

12. The method of claim 10, further comprising:
    caching the data structure.

13. The method of claim 9, further comprising:
    associating the compression ratio range to the memory partition.

14. The method of claim 13, wherein identifying the memory partition among the plurality of memory partitions further comprises: determining that the compression ratio of the data falls in the compression ratio range.

15. The method of claim 9, wherein the plurality of locations on the memory partition are determined based on the compression ratio range associated with the memory partition.

16. The method of claim 9, wherein the memory comprises at least one of: a volatile memory device or a non-volatile memory device.

17. A non-transitory computer-readable storage medium comprising instructions that, when executed by a processing device, cause the processing device to perform operations comprising:
    partitioning a memory into a plurality of memory partitions, wherein each of the plurality of memory partitions is associated with a corresponding partition identifier;
    receiving a host command to access data;
    identifying a compression ratio of the data;
    identifying a memory partition among the plurality of memory partitions;
    identifying a location among a plurality of locations on the memory partition by using a segment identifier and a unit offset address, wherein each of the plurality of locations is associated with a corresponding segment identifier, and wherein the unit offset address is determined in view of a compression ratio range associated with the memory partition; and
    performing an operation regarding the data at the identified location on the memory partition.

18. The non-transitory computer-readable storage medium of claim 17, wherein the processing device is to perform operations further comprising:
    storing, in a data structure, a record indexable by a physical address specified in the host command, wherein the record includes a partition identifier of the memory partition and the segment identifier.

19. The non-transitory computer-readable storage medium of claim 18, wherein the record includes a value in the compression ratio range associated with the memory partition.

20. The non-transitory computer-readable storage medium of claim 18, wherein the processing device is to perform operations further comprising:
    caching the data structure.

* * * * *